July 24, 1934.         H. A. HICKEY         1,967,669
PROCESS OF MAKING PERMANENT OR FIXED GASES FROM FUEL OILS
Filed Jan. 13, 1933
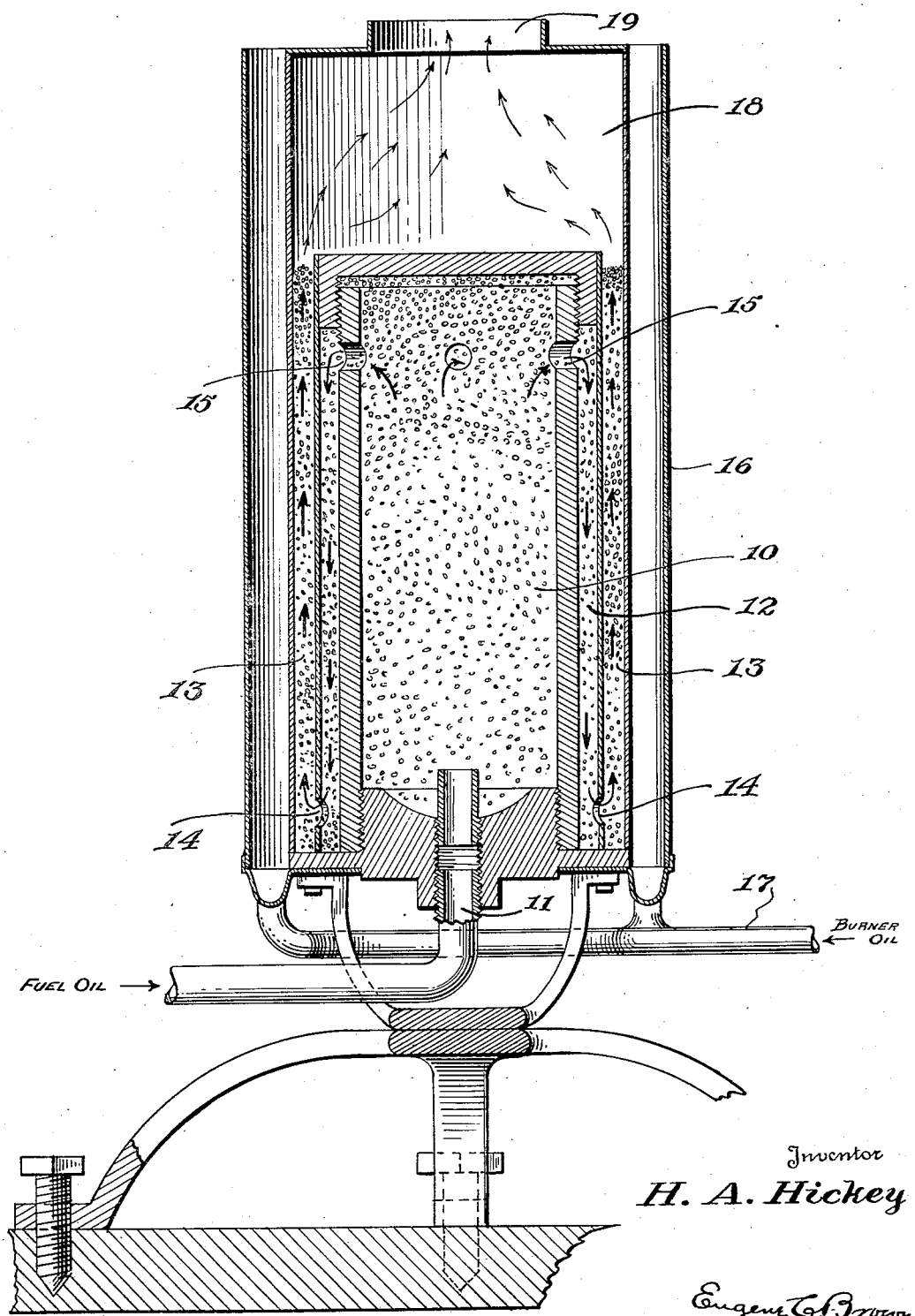
Inventor
H. A. Hickey
Eugene F. Brown
Attorney Patented July 24, 1934

1,967,669

UNITED STATES PATENT OFFICE 1,967,669

PROCESS OF MAKING PERMANENT OR FIXED GASES FROM FUEL OILS

Herbert A. Hickey, Minneapolis, Minn.

Application January 13, 1933, Serial No. 651,599

4 Claims. (Cl. 48—211)

The present invention relates to a process of making permanent or fixed gases from fuel oils.

Briefly stated, the process according to the present invention comprises causing fuel oil in a vaporous state to intimately commingle and contact with a catalyst while gradually heating to the temperature at which complete conversion into permanent gas is effected, and recovering the gas thus formed.

The fuel oil employed for making permanent gas may be any distillate which upon vaporization does not deposit any appreciable amount of sediment. Oil distillates of a medium boiling point have been found to give permanent gas in satisfactory yields. Of course, the heavier oil distillates with higher boiling points may also be used successfully if such distillates upon vaporization deposit little or no sediment. An oil distillate having the following characteristics:

Flash point_____ 165° to 190° F.
Fire point_____ 210° F.
End point_____ 600° to 675° F.
Gravity_____ 34.5° to 39.5° Bé.
Water and sediment_____ None has been found to produce permanent or fixed gas in excellent yields with little or no deposition of carbon.

The catalyst used in the process comprises, preferably a carrier impregnated with a catalytically active substance. The carrier may be any suitable material like fire brick, kieselguhr, diatomaceous earth, or the like. The catalytically active substance may be a metallic oxide, as for example, zirconium oxide, zinc oxide, titanium oxide, yttrium oxide, thorium oxide, magnesium oxide, manganese dioxide, or a mixture of said oxides. Although any of the aforesaid oxides may be employed, other metal oxides which exhibit catalytic properties and are capable of withstanding the temperature at which the conversion of the fuel oil into permanent gas is effected may also be used. Preferably, the catalyst comprises fire brick impregnated with manganese dioxide, which is preferably made by mixing equal parts of finely ground firebrick and manganese dioxide with sufficient water to make a pasty mass, incorporating sodium silicate in sufficient amount to make the mass cohesive, baking the mass, crushing, sizing, and screening the baked mass so as to obtain particles of 10 to 12 mesh size.

The contact between the fuel oil and the catalyst may be effected by passing the vaporous fuel oil up through a stationary mass of catalyst or by passing the fuel oil counter current to a moving mass of catalyst or by injecting the oil vapor and catalyst simultaneously into a closed space. Preferably, the fuel oil vapor is caused to pass up through a stationary mass of granular catalyst.

While the fuel oil vapor is caused to contact with the catalyst, the fuel oil is gradually heated to the temperature at which complete conversion into permanent gas takes place. This may be done by heating the reaction zone containing the catalyst to an elevated temperature, say 1400° to 2000° F. Preferably, the temperature of the reaction zone should be at about 1700° to 1750° F. Owing to the low heat conductivity of the carrier of the catalyst, the catalyst will be of a somewhat lower temperature than the reaction zone. Likewise, the temperature of the catalyst adjacent the point at which the fuel oil is introduced into the reaction zone because of the constant extraction of heat therefrom by the fuel oil in being vaporized is of a lower temperature than the catalyst in the reaction zone near the point where the newly formed gas escapes. In other words, the temperature of the catalyst increases progressively from the inlet to the outlet ends of the reaction zone. Thus, the oil vapor in its course through the catalyst is heated gradually up to the temperature at which decomposition and consequent conversion into permanent gas takes place.

The process is carried out at low pressures or at a pressure sufficient only to maintain a constant flow of fuel oil vapor through the reaction zone. Tests have shown that continuous and complete conversion of the fuel oil into permanent gas without any substantial deposition of carbon is secured at pressures only a few ounces above atmospheric.

In the accompanying drawing is illustrated an apparatus in which the preferred method of the invention may be carried out.

To carry out the preferred method of the invention in the apparatus illustrated, fuel oil of the type that is convertible into a permanent gas is introduced through the inlet 11 into the chamber 10 which is filled with granular catalyst of the nature heretofore mentioned. Surrounding the chamber 10 are annular spaces 12 and 13 which are also filled with the same catalyst. The annular spaces are in communication with each other by means of the ports 14 and with the chamber 10 through the ports 15. The chamber and the annular spaces are heated by means of the jacket 16 which surrounds and encloses the outer wall of the annular space 13. Heat is supplied to the jacket by burning a suitable fuel oil therein, the oil being injected into the jacket by a pipe 17. In order to insure complete combustion of the oil in the jacket exterior wall thereof is preferably provided with perforations for the ingress of air.

The fuel oil upon being admitted to the chamber 10 is immediately heated to a temperature sufficient to vaporize it, say 900° F. The vapor is then forced in turn through the masses of catalyst contained in the chamber and annular spaces. In its course through the chamber and annular spaces the oil vapor is caused to intimately contact with the catalyst and by virtue of such contact is heated gradually up to the temperature where all of the constituents of the oil are completely or substantially so converted into fixed or permanent gas. This results in the conversion of the oil into a fixed gas without any material deposition of carbon.

The gas together with any undecomposed fuel oil then passes from annular space 13 into a free unobstructed space 18 from which it is discharged through the outlet 19. The gas escapes through the outlet 19 and is conveyed either to suitable burners or to a suitable storage vessel.

Having thus described the invention, what is claimed as new and desired to be secured by Letters Patent is:

1. The process of making permanent gas from fuel oils which comprises causing fuel oil in a vapor state to intimately commingle and contact with a catalyst comprising a carrier impregnated with a metallic oxide while gradually heating to the temperature at which complete conversion into permanent gas is effected, and recovering the gas thus formed.

2. The process according to claim 1 wherein the catalyst comprises a carrier impregnated with a manganese dioxide.

3. The process of making permanent gas from fuel oils which comprises causing fuel oil in a vapor state to intimately commingle and contact with a catalyst comprising a carrier impregnated with a metallic oxide while gradually heating to a temperature of at least 1400° F. and not exceeding 2000° F. to thereby convert such oil into permanent gas, and recovering the gas thus formed.

4. The process according to claim 3 wherein the catalyst comprises fire brick impregnated with manganese dioxide.

HERBERT A. HICKEY.